June 9, 1959　　　S. B. PICKLES ET AL　　　2,890,449
RADIO NAVIGATION SYSTEM

Filed Dec. 2, 1953　　　　　　　　　　　　　　　2 Sheets-Sheet 1

INVENTORS
SIDNEY B. PICKLES
SVEN H. M. DODINGTON
GUS STAVIS
BY
Ernest Fanwick
ATTORNEY 2,890,449
Patented June 9, 1959

United States Patent Office

2,890,449
RADIO NAVIGATION SYSTEM

Sidney B. Pickles, White Plains, N.Y., Sven H. M. Dodington, Nutley, N.J., and Gus Stavis, Ossining, N.Y., assignors to International Telephone and Telegraph Corporation, Nutley, N.J., a corporation of Maryland Application December 2, 1953, Serial No. 395,648

11 Claims. (Cl. 343—6.5)

This invention relates to radio navigation systems and more particularly to navigation systems of the rho-$\theta$ type, i.e. systems which indicate the distance and azimuth of a receiver to a radio beacon.

Navigation systems of the rho-$\theta$ type provide means for an aircraft to determine its bearing and distance to a known point thereby providing all the information necessary for a pilot to have in order to determine his position. In some systems heretofore employed the pilot was able to determine his distance to one point and his bearing to another point. Such known systems require the pilot to then plot his location by determining the intersection of his bearing line and distance circle from the known points. In other known systems the pilot did not receive a continuous distance measurement but was required to calculate his distance from known points at varying time intervals.

One of the objects of this invention therefore is to provide at a receiver, continuous and automatic meter indications of the bearing and distance to a transmitter beacon.

Another object of this invention is to provide a combined omnirange and distance measuring system utilizing only one transmitter and one receiver at the beacon and one transmitter and one receiver at the mobile location.

A further object of this invention is to provide a combined omnirange and distance measuring system utilizing pulse modulated RF signals capable of servicing a plurality of mobile craft simultaneously.

According to a feature of this invention a radio navigation system of the rho-$\theta$ type is provided wherein the pulsed output of a constant duty cycle distance measuring beacon is amplitude modulated with a fundamental and harmonic bearing signal and reference pulses for the fundamental and harmonic signals are interspaced with the distance measuring pulses whereby at the transmitter-receiver a distance indication is obtained from the distance measuring pulses and a bearing indication is obtained by comparing the phase difference of the distance measuring pulses, envelope wave components and their respective reference signals.

The above-mentioned and other features and objects of this invention will become more apparent and the invention itself will be best understood by reference to the following description taken in conjunction with the accompanying drawings, in which.

Figure 1:
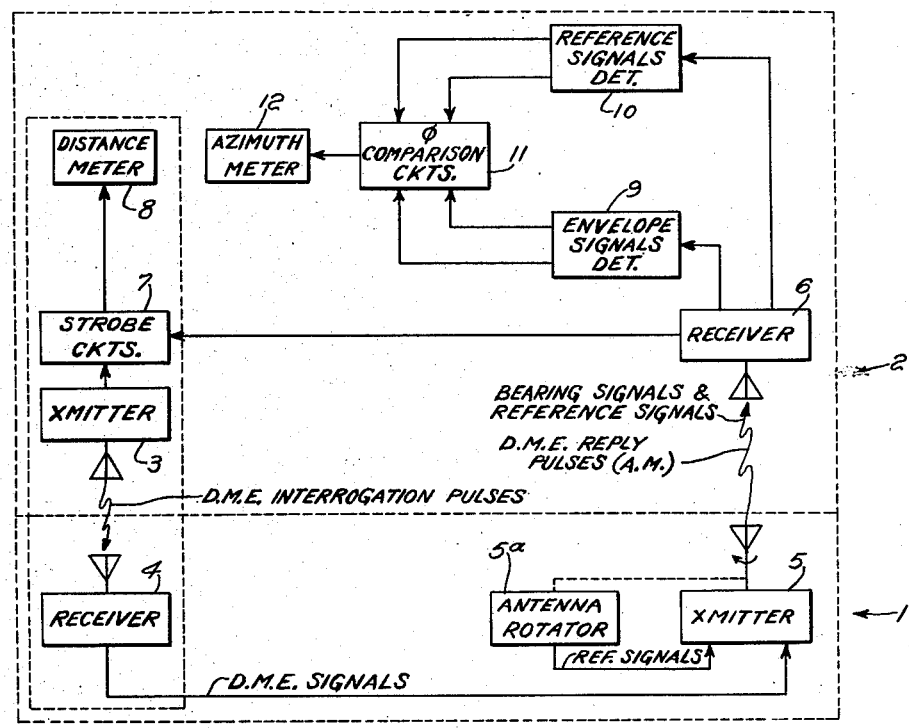
Fig. 1 is a schematic diagram of a combined omnirange and DME (distance measuring equipment) beacon together with a mobile trans-receiver for use therewith.

Referring to Fig. 1, a simplified block diagram of the navigation system according to the principles of this invention is shown comprising a ground beacon 1 and cooperating mobile equipment 2. The mobile transmitter 3 initiates the process of determining the craft's position by radiating coded interrogation pulse signals which are detected by the ground beacon receiver 4. The beacon's transmitter 5 is triggered into radiating DME reply pulses which are detected by the mobile receiver 6. Simultaneously the beacon transmitter 5 may be radiating DME reply pulses to interrogations of other mobile craft. The mobile receiver 6 by stroboscopic examination of the signals detected by receiver 6 in strobe circuit 7 isolates the replies having the same coded repetition rate as its own interrogation pulses from transmitter 3. The strobe circuit 7 then measures the elapsed time between its own interrogation and corresponding reply and converts this into electrical impulses which operates the distance meter 8 which continuously displays the distance to the beacon from the mobile craft. Transmitter 5 produces a more or less steady stream of DME reply pulses depending upon how many aircraft are interrogating the beacon. These pulse reply signals are supplemented as necessary by use of a constant duty cycle DME beacon to insure that a certain number of minimum number of pulses are transmitted per second. Reference may be had to the copending application of S. H. Dodington, Serial No. 276,811, filed February 15, 1952, now Patent No. 2,753,553, for further information about a constant duty cycle type of DME beacon which may be used in this invention. The DME reply pulses and/or supplementary pulses are radiated from an antenna which amplitude modulates the pulses with a bearing envelope wave having a fundamental and harmonic frequency component and introduces reference signals for each component due to the antenna rotator system 5a. The amplitude modulation of the pulses in no way interferes with the distance measuring portion of the system, which depends solely on the time relationship of the interrogation and reply pulses.

In the envelope signal detector circuit 9 the mobile equipment detects and separates the components of the bearing envelope of the amplitude modulated pulses which are radiated in sufficient numbers to allow for reconstruction of the waveform. The phase of the fundamental frequency component of the received envelope is directly proportional to the mobile craft's directional bearing from the beacon; the phase of the harmonic frequency component varies at a faster rate with the bearing depending on the order of harmonic radiated. In order to establish a reference for phase determination on board the mobile craft the beacon transmitter 5 radiates coded reference signals for the fundamental and harmonic components of the bearing envelope wave. The reference signals are detected by the mobile craft equipment in a reference signal detector 10 and compared in phase with their respective components of the envelope wave from detector 9 in the phase comparison circuits 11. The phase comparison of the harmonic signals has a plurality of ambiguities depending on the harmonic order used but the comparison of the fundamental signals resolves this ambiguity. The resulting bearing information is converted into electrical signals which operate the azimuth meter 12 to display the azimuth from the mobile craft to the ground beacon.

Figure 2:
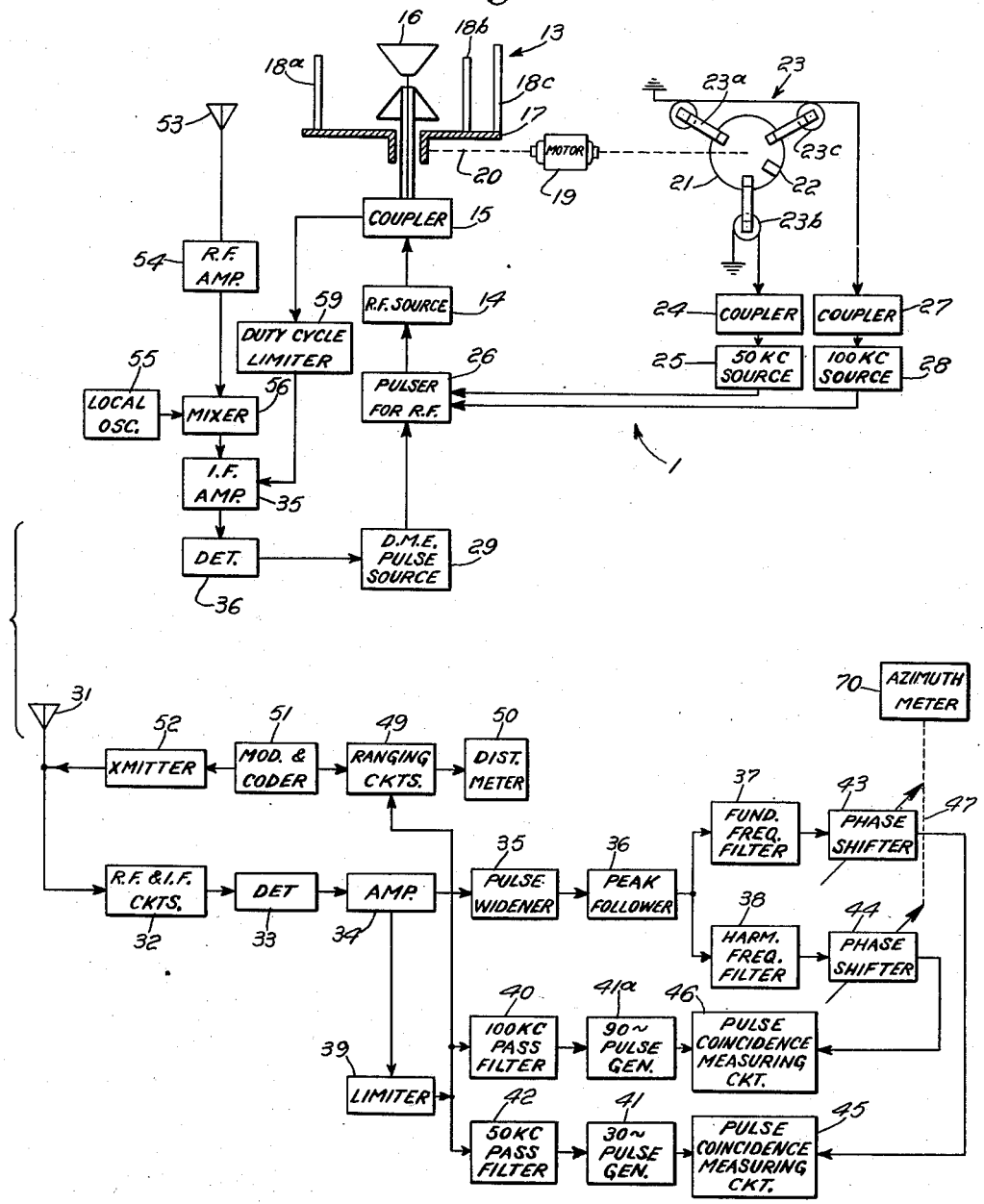
Fig. 2 is a schematic drawing in block form of one form of navigation system including a beacon and a mobile trans-receiver according to the principles of this invention.

Referring to Fig. 2 of the drawing, the combined omnirange and distance measuring equipment of Fig. 1 is shown in more detail. The ground beacon 1 is provided with an antenna system 13 to which is applied a carrier frequency, for instance 1000 mc., from RF source 14 through antenna coupler 15. The antenna system 13 includes a fixed omnidirectional antenna 16 which for purposes of explanation is shown as a single unit, it being understood that a vertical stacked antenna array may be used to increase the vertical concentration of energy. On a disc 17 mounted in spaced relation to antenna 16 is a reflector element 18b and disposed about the periphery of disc 17 are a plurality of symmetrically arranged reflectors 18a and 18c. The disc 17 is rotated at the desired speed, for example 30 revolutions/second by a motor 19 and mechanical linkage 20. Thus as antenna 16 is supplied with energy the rotating reflector 18b distorts the radiated pattern to form the fundamental bearing signal at the receiver and reflectors 18a and 18c provide the harmonic components of the bearing signal. The motor 19 drives disc 21 composed of a non-magnetic material, in synchronism with disc 17 to provide pulses for furnishing the reference signal. Disc 21 has a slug 22 composed of a magnetic material embedded in its surface, so that as the slug 22 passes between the pole faces of magnetic pickup unit 23 each time reflector 18b is in a predetermined position, such as south, a pulse is produced. The metallic slug 22 also passes between the pole faces of magnetic pickup units 23a and 23c each time reflectors 18a and 18c are in a predetermined position, respectively. Output energy from magnetic pickup device 23 is applied through coupler 24 to key a source 25, for example at 50 kc., which supplies through pulser 26 bursts of energy from RF source 14 to the antenna 16 at the 50 kc. rate. Pickup units 23a and 23c serve through coupler 27 and 100 kc. source 28 to supply 100 kc. bursts of energy through pulser 26 to RF source 14 so that these bursts of pulses are transmitted over antenna 16 for each passage of the metallic slug through pickup unit 23a or 23c. Thus each time a reflector 18a, 18b, or 18c is aligned in a desired direction pulses of reference frequency energy are transmitted.

Figure 3:
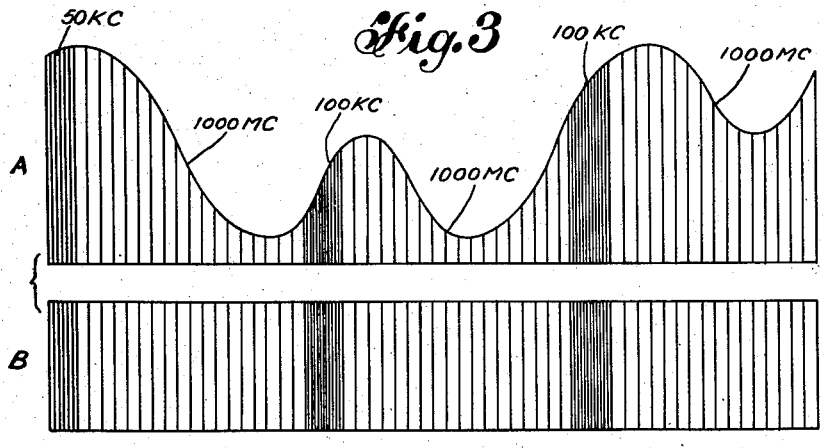
Fig. 3 is a graphic illustration of a set of curves helpful in the explanation of this invention.

Pulse source 29 is controlled by the output of the ground beacon receiver detector 36. In the absence of interrogation by a mobile craft the gain of the IF amplifier 35 is adjusted so that the "grass" output of the ground beacon receiver will actuate pulser 29 to apply through pulse 26 pulses at a more or less random repetition rate, for example 2 kc., to the RF source 14 so that these pulses are transmitted in the interval between the transmission of the reference pulse bursts. Thus in the absence of any interrogation of the ground beacon by a mobile craft, the signal radiated by the ground beacon transmitter, as shown in Fig. 3, curve A, comprises an RF carrier pulsed with reference signals and also pulsed at a more or less random rate in absence of reference signals of a predetermined rate, and amplitude modulated by the rotation of the antenna system.

The radiated signal from the ground beacon is received by the mobile craft's antenna 31 and fed to the usual RF and IF circuits 32 whose output is coupled to detector 33 and then fed to amplifier 34. In order to reconstruct the bearing envelope wave the detected amplifier output from amplifier 34 is coupled to a pulse widener 35 and peak follower 36. A fundamental frequency filter 37 passes only the fundamental frequency component of the bearing envelope wave, i.e., the 30 cycle component. A harmonic frequency filter 38 passes a 90 cycle or harmonic component of the bearing envelope wave.

In order to recover the reference signals the output of amplifier 34 is coupled to limiter 39. The clipped output from limiter 39 as shown in Fig. 3, curve B, which has no amplitude variations is fed to a fundamental reference frequency filter 42 and a harmonic reference frequency filter 40, i.e., a 100 kc. pass filter and a 50 kc. pass filter respectively. The 50 kc. filter 42 passes the fundamental reference pulses which were transmitted each time reflector 18b was in a predetermined position. The fundamental reference signals passed by the 50 kc. filter control a 30 cycle pulse generator 41 which produces a pulse in response to the output of a 50 kc. pass filter 42. The output of the 100 kc. filter 40 controls a 90 cycle pulse generator 41a to produce a reference signal each time reflectors 18a and 18b are in a predetermined position.

The separated fundamental and harmonic components of the bearing signal are coupled to phase shifters 43 and 44, respectively, and then coupled to pulse coincidence measuring circuits 45 and 46, respectively. To obtain from the bearing of the mobile craft to the ground beacon the phase shifters 43 and 44 are adjusted until the pulse coincidence measuring circuits indicate coincidence between the bearing signal and the reference pulses. The pulse coincidence circuit 46 comparing the harmonic component of the bearing signal and the harmonic frequency reference pulses will indicate three ambiguous points. The ambiguity is resolved by the comparison of the fundamental component of the bearing signal and the fundamental frequency reference pulses. A mechanical linkage 47 between the fundamental phase shift of 43 and the harmonic phase shift of 44 having a 1:3 ratio will automatically resolve the ambiguity in the harmonic readings.

In order to obtain a distance reading the clipped pulse output of limiter 39 is coupled to the ranging circuits 49 where the elapsed time between the interrogation of the mobile transmitter and the reply from the ground beacon are converted into electrical signals to actuate the distance meter 50.

To initiate a distance reading, modulator and coder 51 control transmitter 52 to radiate coded interrogation pulses which are picked up by antenna 53 of the ground beacon and coupled to the usual receiver circuits including an RF amplifier 54, local oscillator 55 and mixer 56 and IF amplifier 57. The output of the IF amplifier 35 is fed to detector 36 and then coupled to pulser 29 to actuate the ground beacon to respond in the same code as the received signals. If the output of the transmitter exceeds a predetermined level, duty cycle limiter circuit 59 reduces the sensitivity of the IF amplifier 35 reducing the output of the ground beacon transmitter due to the receiver "grass."

While we have described above the principles of our invention in connection with specific apparatus, it is to be clearly understood that this description is made only by way of example and not as a limitation to the scope of our invention as set forth in the objects thereof and in the accompanying claims.

We claim:

1. A radio navigation system for detecting the position of a mobile craft relative to a radio beacon comprising means carried by said craft for transmitting a plurality of coded interrogation pulses, means at said beacon for transmitting a plurality of reply pulses in response to said interrogation pulses, means at said beacon to transmit reference signal pulses interspaced with said reply pulses, means at said beacon to amplitude modulate said reply and reference signal pulses with a bearing signal wave, a receiver on said craft for receiving said amplitude modulated pulses, means carried by said receiver for comparing the phase of said reference signal pulses and the bearing signal wave carried by said amplitude modulated pulses for determining azimuth and means at said receiver to measure the elapsed time between the transmission of said interrogation pulses and the reception of said reply pulses.

2. A radio navigation system comprising a radio beacon having a receiver, a source of RF carrier energy, means to pulse modulate said RF energy with a fundamental signal reference pulse and a harmonic signal reference pulse, means to also pulse modulate said RF energy responsive to the output of said receiver, means to amplitude modulate the resultant pulse modulated RF energy at a fundamental frequency and at least one harmonic of said fundamental frequency, the phase of said fundamental and harmonic modulations varying relative to said reference pulses at different azimuthal angles from said beacon, and means to radiate said amplitude modulated RF energy at said beacon; and a station spaced from said beacon having a receiver for receiving the amplitude modulated RF energy radiated by said beacon, means to derive from said fundamental and said harmonic amplitude modulation a fundamental and a harmonic wave, means to separate said fundamental and harmonic reference pulse, means to compare the phase of said fundamental wave with the fundamental reference pulse and means to compare the phase of the harmonic wave with the harmonic reference pulse, a transmitter of pulse modulated energy and means to measure the elapsed time between the transmission of the pulse modulated RF energy output from said transmitter to the first mentioned receiver and the corresponding pulse modulated received signals at said station.

3. A radio navigation system according to claim 2, wherein said means to amplitude modulate said resultant pulse modulated radio frequency energy comprises an antenna system at said beacon having a central radiator and a plurality of separated reflectors about said central radiator, means to produce effective rotation of said spaced reflectors about said radiator whereby the radiations at a fixed position with respect to said central radiator will vary with the fundamental frequency dependent upon the rotation speed, said reflectors being spaced to produce at least one harmonic frequency of said fundamental frequency.

4. A radio navigation system according to claim 2, wherein said means at said beacon to pulse modulate said RF energy with a fundamental signal reference pulse and a harmonic signal reference pulse comprises a source of energy for the fundamental reference signal, means to pulse said RF carrier energy in synchronism with said amplitude modulating means at the frequency of said energy for the fundamental reference signal, a source of energy for the harmonic reference signal, and means to pulse said RF carrier energy in synchronism with said amplitude modulating means at the frequency of said energy for the harmonic reference signal.

5. A radio navigation system according to claim 2, wherein said means at said station to derive a fundamental and a harmonic wave comprises a fundamental frequency band pass filter and a harmonic frequency band pass filter.

6. A radio navigation system according to claim 2, wherein said means at said station to compare the phase of said fundamental and harmonic wave and their respective reference pulse signals comprise means to measure the time coincidence of said reference pulses with the respective waves.

7. A radio navigation system according to claim 6, wherein said means at said station to compare the phase of said fundamental and harmonic wave and their respective reference pulses includes means to adjust the phase of said waves.

8. A radio receiver carried by a mobile craft having a transmitter, for determining its position from a known radio beacon transmitting pulse coded RF energy in response to the transmission of actuating RF energy from said transmitter where at said beacon said energy is amplitude modulated with a bearing envelope wave and pulse reference signal energy is radiated comprising at said receiver means to receive said radiated energy, means to separate said bearing envelope wave, means to detect said reference signal, means to compare the phase of the bearing envelope wave with the reference signal, and means to measure the elapsed time between the transmission of the actuating RF energy from said mobile craft and the response signals received from said radio beacon.

9. A transmitting system for radiating pulsed RF energy in response to interrogations from a mobile craft comprising means to receive said interrogations, means actuated by said received interrogations to transmit pulsed RF energy, means to amplitude modulate said pulsed RF energy with a bearing envelope wave, and means to transmit a bearing reference signal whereby at a given position from said beacon the phase difference between said bearing envelope wave and the reference signal will indicate the azimuth to said beacon from said given position and the time elapse between the transmission of said interrogations and the reception of said responses will indicate the distance of said position from said beacon.

10. A radio navigation system comprising a radio beacon having an omnidirectional antenna system, a receiver coupled to said beacon antenna system, a source of RF carrier energy, means to pulse modulate said RF energy responsive to the output of said receiver, means to cyclically pulse modulate said RF energy with fundamental signal reference pulses and harmonic signal reference pulses, a directional antenna system producing a multilobed radiation pattern, means for applying said RF energy, modulated with said receiver output and said reference pulses, to said directional antenna system, and means for rotating said multilobed radiation pattern at a frequency equal to the repetition frequency of said fundamental signal reference pulses to effectively amplitude modulate said pulse modulated RF energy at a fundamental frequency and at least one harmonic of said fundamental frequency; and a station spaced from said beacon having a substantially omnidirectional antenna system, a second receiver coupled to said station's omnidirectional antenna system for receiving the amplitude modulated energy radiated by said beacon, means to derive from said fundamental amplitude modulation and said harmonic amplitude modulation a fundamental and a harmonic wave, means to separate said fundamental and harmonic reference pulses, means to compare the phase of said fundamental wave with that of the fundamental reference pulses, and means to compare the phase of the harmonic wave with that of the harmonic reference pulses, an omnidirectional transmitter of pulse modulated RF energy, and means to measure the elapsed time between the transmission of the pulse modulated RF energy from said transmitter to the first-mentioned receiver at said beacon and the corresponding pulse modulated signals returned therefrom and received at said station.

11. Navigation equipment adapted to be carried on a mobile craft for determining its position from a known radio beacon, wherein said beacon transmits coded pulses of RF energy in response to actuating coded pulse signals from said navigation equipment, said beacon also transmitting reference pulse signal energy, with both said RF energy and said reference pulse signal energy being amplitude modulated with a bearing envelope wave; comprising a transmitter for transmitting actuating coded pulse signals to said beacon to evoke coded pulses of RF energy therefrom, a receiver for receiving the energy radiated by said beacon, means to separate said bearing envelope wave, means to detect said reference signal energy, means to compare the phase of the bearing envelope wave with the reference signal energy, and means to measure the elapsed time between the transmission of the actuating coded pulse signals from said mobile craft and the receiving at said mobile craft of the corresponding response signals of coded pulses of RF energy from said beacon.

References Cited in the file of this patent

UNITED STATES PATENTS

| | | |
|---|---|---|
| 2,480,123 | Deloraine et al. | Aug. 30, 1949 |
| 2,485,618 | Mackata | Oct. 25, 1949 |
| 2,563,902 | Yost | Apr. 14, 1951 |
| 2,564,703 | Litchford et al. | Aug. 21, 1951 |
| 2,565,506 | Litchford | Aug. 28, 1951 |
| 2,568,265 | Alvarez | Sept. 18, 1951 |

FOREIGN PATENTS

| | | |
|---|---|---|
| 615,667 | Great Britain | Jan. 10, 1949 |